United States Patent [19]

Takahata

[11] 4,212,893

[45] Jul. 15, 1980

[54] ACIDIFIED WHOLE MILK BEVERAGE AND METHOD OF PREPARATION

[75] Inventor: Jungo Takahata, Machida, Japan

[73] Assignee: Honey Bee Corporation, Tokyo, Japan

[21] Appl. No.: 910,286

[22] Filed: May 30, 1978

[30] Foreign Application Priority Data

Feb. 10, 1978 [JP] Japan .................................. 53-14348
Feb. 10, 1978 [JP] Japan .................................. 53-14349

[51] Int. Cl.² .......................... A23C 9/08; A23C 9/10; A23L 2/02
[52] U.S. Cl. .............................. 426/330.2; 426/330.3; 426/334; 426/524; 426/590; 426/519; 426/521; 426/654
[58] Field of Search ................... 426/330.2, 330.3, 334, 426/573, 575, 577, 580, 584, 590, 599, 519, 654, 521

[56] References Cited

U.S. PATENT DOCUMENTS

| | | | |
|---|---|---|---|
| 2,818,342 | 12/1957 | Ransom | 426/584 |
| 3,432,306 | 3/1969 | Edwards | 426/330.2 |
| 3,647,476 | 3/1972 | Swisher | 426/584 |
| 3,692,532 | 9/1972 | Shenkenberg et al. | 426/584 |
| 4,046,925 | 9/1977 | Igoe | 426/580 X |
| 4,078,092 | 3/1978 | Nishiyama | 426/599 X |

FOREIGN PATENT DOCUMENTS

| | | | |
|---|---|---|---|
| 284278 | 4/1929 | United Kingdom | 426/584 |
| 986940 | 3/1965 | United Kingdom | 426/580 |

*Primary Examiner*—Arthur L. Corbin
*Attorney, Agent, or Firm*—Frishauf, Holtz, Goodman & Woodward

[57] ABSTRACT

An acidified whole milk beverage having an acidic pH and containing locust bean gum as a stabilizer. An aqueous solution of locust bean gum is added to whole milk after which a fruit juice or organic acid is added thereto to impart the acidic pH. The milk beverage is then homogenized and sterilized.

13 Claims, No Drawings

ACIDIFIED WHOLE MILK BEVERAGE AND METHOD OF PREPARATION

This invention relates to an acidified beverage of whole milk, and more particularly to an acidified beverage of whole milk which maintains a stable emulsified state, wherein curd is not segregated, although the whole milk has not been stripped of fat.

Milk beverage is a kind of soft drink prepared from whole milk or skim milk with addition of, for example, sugar. A flavorful milk beverage wherein the main component, whole milk or skim milk, is mixed with sugar, fruit flavour and coloring matter is known. Such milk beverage is favourably accepted as the type having a peculiar milk flavour but not an acid beverage.

On the other hand, acid beverages having a pH value less than 4.5 is a refreshing beverage of high acidity. As is well known, fruit juice beverage is a typical acid beverage.

At present when a flavorful beverage is increasingly accepted, strong demand is made to provide new milk-containing acid beverage concurrently possessing a flavour peculiar to milk and a refreshing taste derived from high acidity. However, when mixed with acid, fat and protein contained in milk are coagulated and segregated in the form of curd. This tendency is particularly noticeable in whole milk unstripped of fat. Therefore, whole milk has hitherto failed to be used as one component of such acid beverage.

Sour milk beverage is known as a kind of said beverage wherein the main component is skim milk stripped of fat. This is a drink prepared from skim milk fermented by lactic acid bacteria with addition of, for example, sugar. However, this known milk beverage, which is indirectly acidified skim milk by an acid resulting from fermentation by lactic acid bacteria, is distinctly different from the whole milk-containing acidified beverage of this invention which is acidified by direct addition of an acidifying agent.

As described above, acidified beverage containing whole milk has not been known to date. The reason is that when mixed with an acidifying agent such as fruit juice or lactic acid, the whole milk is divided into a liquid portion and a coagulated portion referred to as curd, failing to provide a uniformly emulsified milk beverage.

It is accordingly the object of this invention to provide a whole milk-containing acidified beverage which is maintained in a stable emulsified state due to the use of a special stabilizing agent.

The present inventor has discovered that use of a very small amount of locust bean gum as a stabilizing agent enables whole milk to maintain a stable emulsified state without causing the curd to be segregated from the whole milk even when mixed with fruit juice or organic acid.

According to the invention, there is provided a whole milk-containing acidified beverage which mainly contains whole milk and fruit juice and/or organic acid and further contains locust bean gum as a stabilizing agent, and is thereby maintained in a stable emulsified state. In a preferred embodiment, the whole milk-containing acidified beverage of the invention can retain a more stable emulsified state by using pectin or agar as an auxiliary stabilizing agent together with the locust bean gum used as the main stabilizing agent.

The acidified beverage of this invention mainly contains whole milk. The whole milk may be cow's milk, goat's milk or sheep's milk. Since, however, cow's milk is generally accepted, the following description relates to a cow's milk.

The whole milk used with the acidified beverage of this invention may be a commercially available market milk prepared by treating raw milk for use as beverage. The whole milk contains about 3.3% or over of milk fat in the form of extremely fine fat particles. The pH value of whole milk is generally 6.4 to 6.6. Further, the whole milk containing fat is superior to skim milk in respect of nutrition, calorie and taste.

The fruit juice used with the acidified beverage of the invention may be extracted from any fruit. A fruit puree is included in the scope of the fruit juice. However, preferred are the juices of, for example, oranges, pineapples, apples, grapes, grapefruits, lemons, melons and strawberries. Where lemon juice of high acidity is used, it may be unnecessary to apply any extra organic acid in order to acidify the beverage. Yet, it is generally advised to use both fruit juice and organic acid in order to acidify the beverage in the easily drinkable form and also prevent the beverage from putrefaction. According to the invention, the finished whole milk-containing acidified beverage is so controlled as to have a pH value falling within the range of 2.5 to 4.5, or preferably 3.0 to 4.0, or more preferably 3.4 to 3.6. Or, it is possible to acidify the beverage simply using an organic acid without also using fruit juice.

Any organic acid is applicable, provided its use is acceptable for manufacture of beverage. Organic acids available for the present beverage include, for example, succinic acid, lactic acid, malic acid, tartaric acid, citric acid, gluconic acid and ascorbic acid. Particularly preferred are lactic acid and citric acid.

According to the invention, locust bean gum is used as a stabilizing agent for preventing the fat and protein of the whole milk from being segregated in the form of curd. Commercially available locust bean gum may be used in the form of solids or an aqueous solution. It is preferred to use pectin or agar with locust bean gum. Use of these auxiliary stabilizing agents provides a beverage which is soft and pleasant to the palate due to the fat and protein of the milk being dispersed in a more stable condition.

Obviously, the acidified beverage of whole milk of this invention may be mixed with not only the above-mentioned components but also the customary additives, such as sugar, in order to meet the relish of consumers. Addition of these additives can be easily effected by those skilled in the art and is of course included in the scope of this invention. Additives usable with the present acidified beverage of whole milk include natural sweetening agents such as cane sugar and grape sugar, synthesized sweetening agents, flavouring agents such as orange flavour, seasonings such as aminoacid, colouring matter, table salt and all other auxiliary condiments used in this particular field. Further, any other authorized additives such as an antioxidant may obviously be used. The saccharinity of the present acidified beverage of whole milk varies with the kind of fruit juice added. Generally preferred is the saccharinity of about 10° to 13° as measured by a saccharimeter.

The present acidified beverage of whole milk is prepared through the following steps:

(1) locust bean gum is dissolved in whole milk;

(2) the whole milk emulsion which is formed is mixed at a temperature of 35° to 60° C. with at least one acidifying agent selected from the group consisting of fruit juice and organic acid; and (3) the acidified whole milk emulsion is homogenized.

In the first step, the locust bean gum may be added in the form of powder, but it is more convenient to apply said gum in the form of an aqueous solution. Part or all of the usable additives can be dissolved in the aqueous solution of locust bean gum. It is preferred to add sweetening agents and table salt to said solution, followed by thermal sterilization. The locust bean gum is readily soluble in water at a higher temperature than about 80° C. The locust bean gum should be added in an amount of 0.1 to 1.0% by weight or preferably 0.2 to 0.3% by weight based on the total weight of the finished product. Addition of the locust bean gum over 1.0% by weight will result in a finished product too viscous for beverage. An auxiliary stabilizing agent such as pectin or agar should be added together with the locust bean gum in an amount smaller than 0.1% by weight, or preferably 0.03 to 0.06% by weight of the finished product. Use of these auxiliary stabilizing agent provides an acidified beverage of whole milk which is more stable and softer to the palate. Agar is preferred in respect of handling.

In the second step, an emulsion of whole milk containing the locust bean gum is mixed with fruit juice, organic acid or a mixture thereof, followed by thorough stirring. The fruit juice or organic acid should be added after the locust bean gum is fully dissolved in whole milk. The reason is that if a whole milk free from locust bean gum is added to fruit juice or organic acid, then fat and casein will be segregated in the form of curd. The temperature at which the emulsion of whole milk is mixed with fruit juice or organic acid in the second step is an important factor. A temperature lower than 35° C. will require a long time to convert the mixture into a stable emulsion. Conversely, a temperature higher than 60° C. will readily give rise to the abovementioned segregation. Therefore, the emulsion of whole milk containing the locust bean gum should be mixed with fruit juice or organic acid at a temperature of 35° C. to 60° C., or preferably 40° C. to 50° C. The mixed whole milk should preferably be stirred about 10 to 30 minutes at said temperature or while the solution is allowed to cool, in order to stabilize the emulsified acidified whole milk.

It is desired that addition of additives or ingredients other than the fruit juice or organic acid be completed, before the second step is brought to an end. The pH value of the acidified beverage of whole milk is controlled, if necessary, during the second step.

According to this invention, whole milk and fruit juice or organic acid may be mixed together in any optional ratio. To assure a pH value of 2.5 to 4.5 required for an acid beverage, however, it is necessary to add a larger amount of fruit juice or organic acid as the amount of whole milk increases. Generally, the proportion of whole milk should preferably fall within the range of about 10 to 60% by weight based on the total weight of the finished product. A smaller content of whole milk provides a more acidified product, whereas a larger proportion of whole milk produces a beverage in which the milk flavour surpasses the acid flavour.

In the third step, the acidified emulsion of whole milk prepared in the second step is homogenized for greater stability. This homogenizing step can be effected under the customary condition using a homogenizer, for example, the Gauline homogenizer generally used in the homogenized milk-producing industry. When said Gauline homogenizer is used, the acidified milk emulsion is forced out of very fine orifices under high pressure. In this case, the rapid pressure drop breaks up fat particles into far smaller form. Therefore, it is possible to produce an acidified beverage of whole milk which can maintain a very stable emulsified condition for a long time, though the pH value is lower than 4.5.

The acidified beverage of whole milk according to this invention can be marketed in a metal or paper container. Before being placed in the container, the acidified milk beverage is sterilized in the same manner as market milk, that is, quickly at high temperature or slowly at low temperature. Preferably, sterilization is carried out for 15 seconds at high temperature, for example, 80° C. When a metal container is used, the acidified beverage of whole milk is quenched to a lower temperature than about 15° C. after being placed into the metal container. When a paper container is used, the beverage is quenched to a lower temperature than about 4° C. before being filled in the paper container.

The acidified beverage of whole milk of this invention is designed to have a pH value of 2.5 to 4.5, or preferably 3.0 to 4.0, or more preferably 3.4 to 3.6. This beverage maintains a stable emulsified condition free from segregated curds of milk fat and protein in spite of the above-mentioned low pH value and the inclusion of whole milk. This advantageous effect is assumed to result from the fact that molecules of locust bean gum coat the fine milk fat solids, thereby preventing their segregation.

The acidified beverage of whole milk according to this invention is characterized by not only a flavour of milk but also a refreshing acid taste. Where acidified by fruit juice, the beverage is provided with the taste, flavour and colour of said fruit juice. The present acidified beverage of whole milk is superior to the prior art acid beverage containing skim milk with respect to nutrition and calorie.

Further, the present acidified beverage of whole milk whose pH value is lower than 4.5 retards the propagation of remaining microbes and consequently has longer shelf life than the conventional similar products.

This invention will be more fully understood by reference to the examples which follow. It will be noted that the conditions such as the composition of an acidified beverage of whole milk and temperature used in the examples will not restrict the invention in any way.

EXAMPLE 1

5 kg of cane sugar, 1.5 kg of grape sugar, 20 g of table salt and 200 g of locust bean gum were thoroughly dissolved with stirring in 20 l of water at 80° C. The mixture was boiled 20 minutes at 90° C. for sterilization. After cooled, the solution was mixed with 15 l of commercially available whole milk and a proper amount of orange flavour, followed by full stirring. 7.5 l of orange juice and 150 g of citric acid were dissolved in 10 l of warm water. This solution was added to the above-mentioned solution containing the milk and locust bean gum at a temperature of about 50° C. in about 5 minutes, followed by stirring. Later, stirring was continued about 20 minutes at the same temperature. At this time, citric acid was added in a sufficient amount to set the pH value of the entire solution at 3.5. Last, homogenization was carried out by the Gauline homogenizer, providing an acidified beverage of whole milk maintained in a stable emulsified condition free from segregated curds. The product had a saccharinity of 11° as measured by the Abbe's saccharimeter.

After being sterilized at 80° C., the acidified beverage of whole milk was placed into a metal container, followed by quenching to 15° C. After being stored one year, the beverage did not contain any sediment, but maintained a stable emulsified condition.

EXAMPLE 2

Acidified beverage of whole milk was produced substantially in the same manner as in Example 1, except that not only 200 g of locust bean gum but also 40 g of agar were jointly used as a stabilizing agent. An acidified beverage of whole milk thus prepared maintained a stable emulsified state free from segregated curds.

EXAMPLE 3

100 g of cane sugar, and 3 g of locust bean gum were dissolved with stirring in 200 cc of water at 85° C. 400 cc of whole milk was added to the solution. Later, 1 g of citric acid, and 4 cc of lactic acid were added at a temperature of about 50° C. in about 5 minutes. 0.3 cc of lemon flavour was added to the mixture. The whole mass was stirred about 20 minutes at a temperature of about 50° C. Further, citric acid was added in a sufficient amount to set the pH value of the milk beverage thus prepared at 3.5. Finally, the mixed mass was homogenized by the Gauline homogenizer, providing an acidified beverage of whole milk lacking fruit juice. This product also maintained a stable emulsified state free from segregated curds.

What is claimed is:

1. A method of manufacturing a stable, emulsified, acidified whole milk beverage which comprises
   (1) adding an aqueous solution of locust bean gum to whole milk, the amount of locust bean gum being 0.3% by weight based on the total weight of said milk beverage, and agitating to form a whole milk emulsion;
   (2) mixing said whole milk emulsion with at least one acidifying agent selected from the group consisting of fruit juice and organic acids acceptable for use with a beverage, at a temperature of 35° to 60° C., to form an acidified emulsion having a pH of between 3.4 and 3.6;
   (3) stabilizing said acidified emulsion by stirring for 10 to 30 minutes;
   (4) homogenizing said stabilized acidified emulsion of whole milk; and then
   (5) sterilizing said stabilized, acidified emulsion of whole milk and placing it into a container, thereby producing a stable, emulsified whole milk, free from segregated curds, having a pH of from 3.4 to 3.6.

2. The method according to claim 1, wherein agar or pectin is added as an auxiliary stabilizing agent together with the locust bean gum in an amount less than 0.1% by weight based on the total weight of the finished product.

3. The method according to claim 2, wherein the auxiliary stabilizing agent is added in an amount of 0.03 to 0.06% by weight based on the total weight of the finished product.

4. The method according to claim 1, wherein the emulsion of whole milk containing locust bean gum is mixed with the acidifying agent at a temperature of 40° to 50° C. in step (2).

5. The method according to claim 1, wherein the acidified emulsion of whole milk is homogenized by passage through a Gauline homogenizer.

6. A stable, emulsified, acidified whole milk beverage free from segregated curds comprising whole milk, water, 0.3% by weight of locust bean gum, based on the total weight of the beverage, as a stabilizing agent, and an amount of at least one acidifying agent, selected from the group consisting of fruit juice and organic acids acceptable for use with beverages, sufficient to impart a pH of between 3.4 and 3.6 to said beverage.

7. The acidified milk beverage according to claim 6, wherein the fruit juice is at least one juice from a fruit selected from the group consisting of oranges, pineapples, apples, grapes, grapefruits, lemons, melons and strawberries.

8. The acidified milk beverage according to claim 7 or 6, wherein the organic acid is at least one selected from the group consisting of succinic acid, lactic acid, malic acid, tartaric acid, citric acid, gluconic acid and ascorbic acid.

9. The acidified milk beverage according to claim 6, which mainly consists of whole milk, fruit juice and organic acid.

10. The acidified milk beverage according to claim 6, whose saccharinity ranges from about 10° to 13° as measured by a saccharimeter.

11. A stable, emulsified, acidified whole milk beverage free from segregated curds consisting essentially of whole milk, water, fruit juice, an organic acid acceptable for use with a beverage, a sweetening agent, and 0.3% by weight of locust bean gum, as a stabilizer, based on the total weight of said beverage, said beverage containing sufficient fruit juice and organic acid to impart a pH of from 3.4 to 3.6 to said beverage.

12. The acidified milk beverage according to claim 6 or 11, which further contains less than 0.1% by weight of agar or pectin as an auxiliary stabilizing agent based on the total weight of the beverage.

13. The acidified milk beverage according to claim 12, which further contains 0.03 to 0.06% by weight of the auxiliary stabilizing agent based on the total weight of the beverage.

* * * * *